(12) United States Patent
Mooney

(10) Patent No.: US 8,225,521 B1
(45) Date of Patent: Jul. 24, 2012

(54) TAPE SYSTEM FOR FRAMING

(76) Inventor: Darrell R. Mooney, Belton, TX (US)

( * ) Notice: Subject to any disclaimer, the term of this patent is extended or adjusted under 35 U.S.C. 154(b) by 166 days.

(21) Appl. No.: 12/828,731

(22) Filed: Jul. 1, 2010

(51) Int. Cl.
*G01B 3/10* (2006.01)
*G01B 3/02* (2006.01)

(52) U.S. Cl. .............................. 33/758; 33/759; 33/194

(58) Field of Classification Search ............ 33/194, 33/494, 562, 563, 566, 679.1, 758, 759, 760, 33/771; D10/71
See application file for complete search history.

(56) References Cited

U.S. PATENT DOCUMENTS

| | | | |
|---|---|---|---|
| 2,187,087 A * | 1/1940 | Leary ............................... | 33/758 |
| 4,149,320 A | 4/1979 | Troyer et al. | |
| D260,738 S | 9/1981 | Smith | |
| 4,367,590 A * | 1/1983 | Winter et al. ..................... | 33/758 |
| 4,845,858 A * | 7/1989 | Thomas ........................... | 33/759 |
| 4,942,670 A * | 7/1990 | Brandt ............................. | 33/494 |
| 5,012,590 A | 5/1991 | Wagner et al. | |
| 5,627,763 A * | 5/1997 | Carlson .............................. | 703/1 |
| 6,360,448 B1 * | 3/2002 | Smyj ................................ | 33/562 |
| 6,397,487 B1 * | 6/2002 | Welch et al. ..................... | 33/759 |
| 6,684,522 B2 | 2/2004 | Chilton | |
| D522,390 S * | 6/2006 | Bowen ............................ | D10/71 |
| 7,059,061 B2 | 6/2006 | French | |
| 7,293,368 B1 * | 11/2007 | Faulk et al. ...................... | 33/758 |
| 7,373,731 B2 | 5/2008 | Nyberg | |
| D572,156 S | 7/2008 | Payne | |
| 7,644,510 B2 * | 1/2010 | Gingerella et al. .............. | 33/758 |
| 2002/0038518 A1 * | 4/2002 | Barrows .......................... | 33/758 |
| 2006/0096112 A1 | 5/2006 | Berring | |

FOREIGN PATENT DOCUMENTS

WO WO 8900673 A1 * 1/1989

\* cited by examiner

*Primary Examiner* — R. A. Smith

(57) ABSTRACT

A tape system for obtaining accurate construction layouts featuring an elongated strand with an adhesive disposed on the bottom surface, the strand is flexible to allow movement between a rolled configuration and an elongated configuration; a center line disposed in a middle of the strand running from the first end to the second end of the strand; a plurality of center markers disposed along the strand spaced a certain distance apart, the center line divides each center marker into a top portion and a bottom portion, wherein both the top portion and the bottom portion of each center marker is labeled with a first letter, a second letter, a third letter, and a fourth letter; and perforations disposed in each center marker, the perforations being perpendicular to the center line and extending from the first edge of the strand to the second edge of the strand.

3 Claims, 4 Drawing Sheets

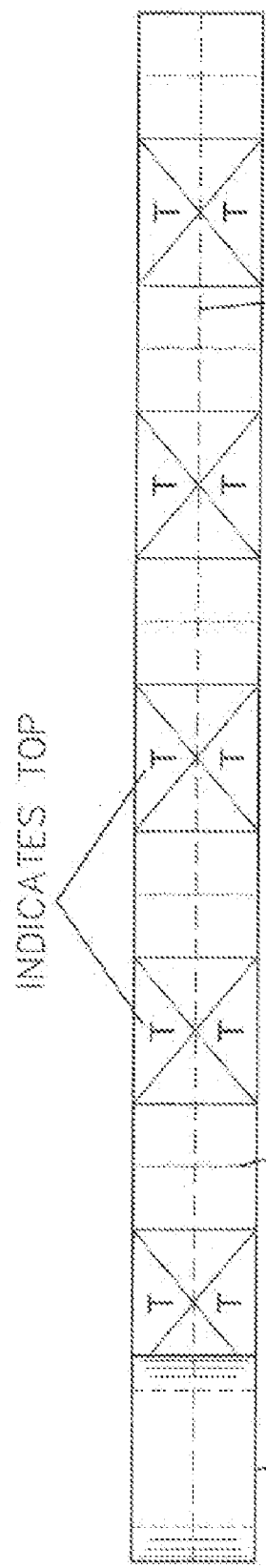
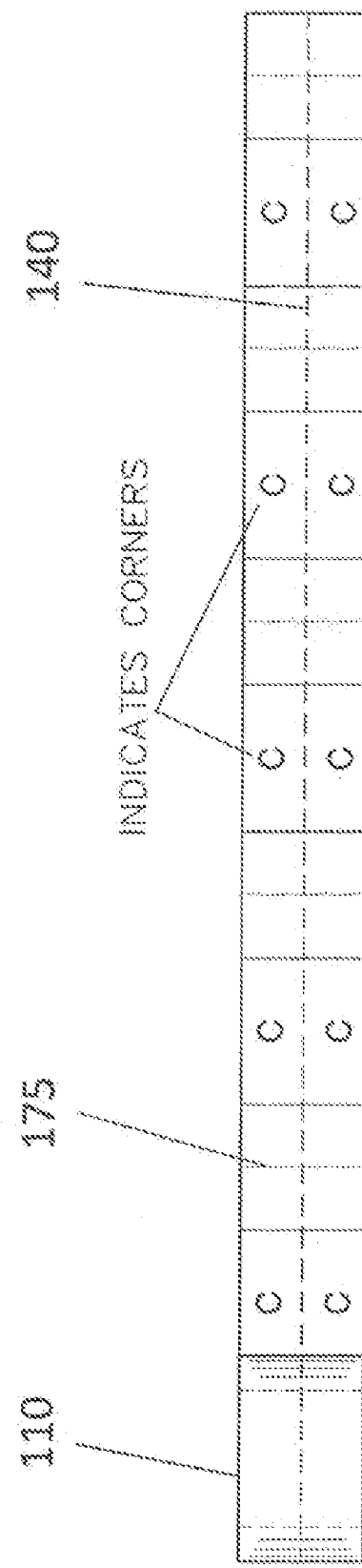
FIG. 4
FIG. 5

TAPE SYSTEM FOR FRAMING

FIELD OF THE INVENTION

The present invention is directed to tape, more particularly to a style of tape used for framing wood, metal joist rafters, etc.

BACKGROUND OF THE INVENTION

Framing requires a great deal of precision and accuracy. The present invention features a tape system for framing. The tape system may help to ensure frame pieces (e.g., wood, metal joist rafters, etc.) are assembled appropriately and exactly. Without wishing to limit the present invention to any theory or mechanism, it is believed that the tape system of the present invention is advantageous because it can help a user save time and avoid layout mistakes.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a tape system for obtaining accurate construction layouts. In some embodiments, the tape system comprises an elongated strand having a first end, a second end, a first edge, a second edge, a top surface, and a bottom surface, wherein an adhesive is disposed on the bottom surface, the strand is flexible to allow movement between a rolled configuration and an elongated configuration when laid across a construction component; a center line disposed in a middle of the strand running from the first end to the second end of the strand; a plurality of center markers disposed along the strand, the center markers are each spaced a first distance apart (e.g., 16 inches, 24 inches, etc.), wherein the center line divides each center marker into a top portion and a bottom portion, wherein both the top portion and the bottom portion of each center marker is labeled with a first letter, a second letter, a third letter, and a fourth letter, the first letter being positioned to the left of the second letter, the second letter being positioned to the left of the third letter, the third letter being positioned to the left of the fourth letter; and perforations disposed in each center marker, the perforations being perpendicular to the center line and extending from the first edge of the strand to the second edge of the strand in between the second letters and third letters, the perforations allow the strand to be torn. In some embodiments, the first letter, second letter, third letter, or fourth letter is C, S, or T.

BRIEF DESCRIPTION OF THE DRAWINGS

FIG. 4 is a top view of an embodiment of the tape system of the present invention.

FIG. 5 is a top view of an embodiment of the tape system of the present invention.

DESCRIPTION OF PREFERRED EMBODIMENTS

Figure 1:
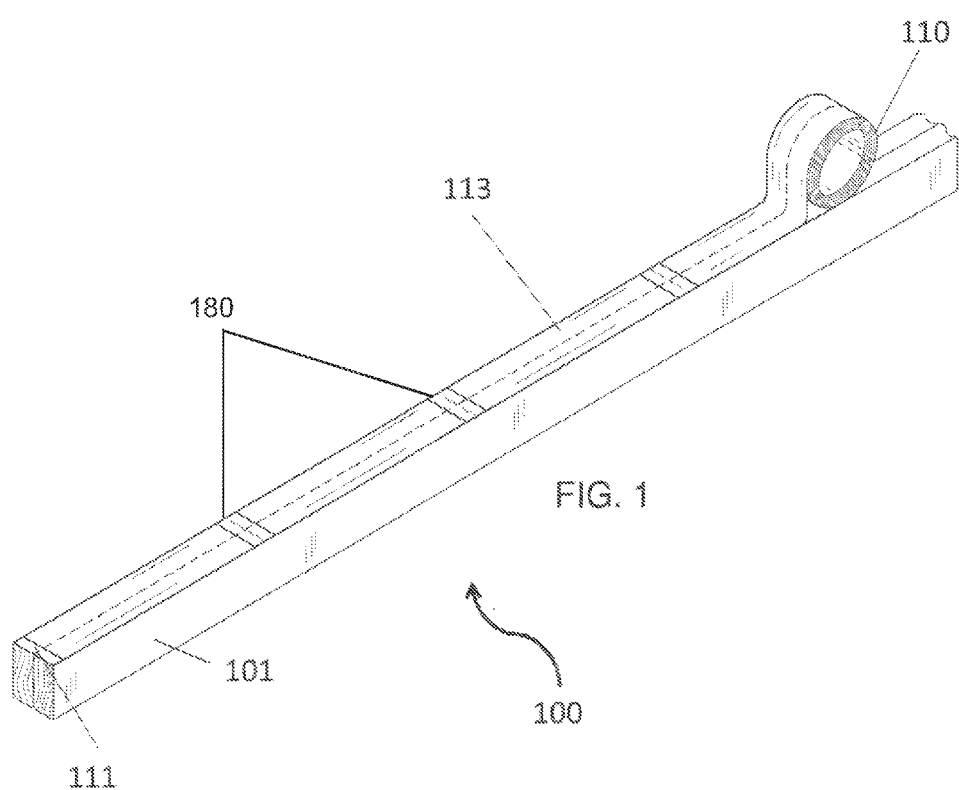
FIG. 1 is a perspective in-use view of the tape system of the present invention as used on a 2×4 stud.
Figure 2:
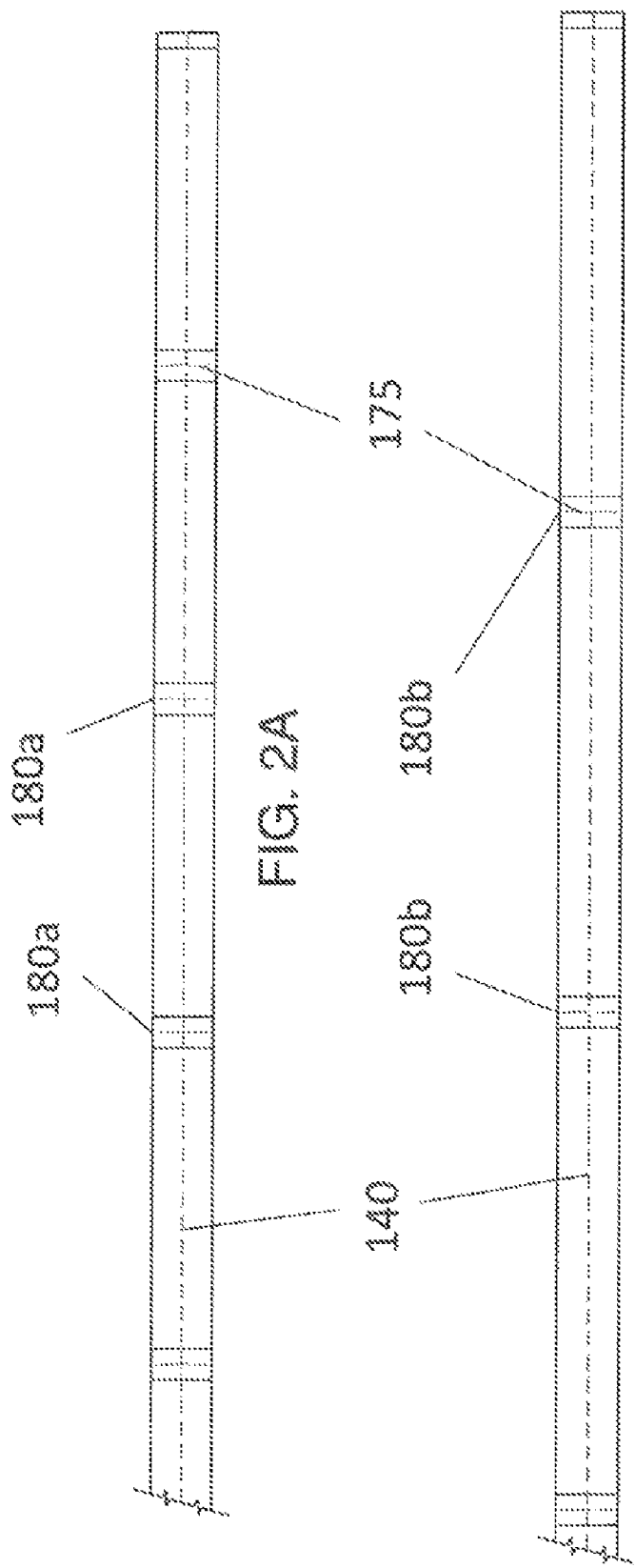
FIG. 2A is a top view of a first embodiment of the tape system of the present invention.
FIG. 2B is a top view of a second embodiment of the tape system of the present invention.
Figure 3:
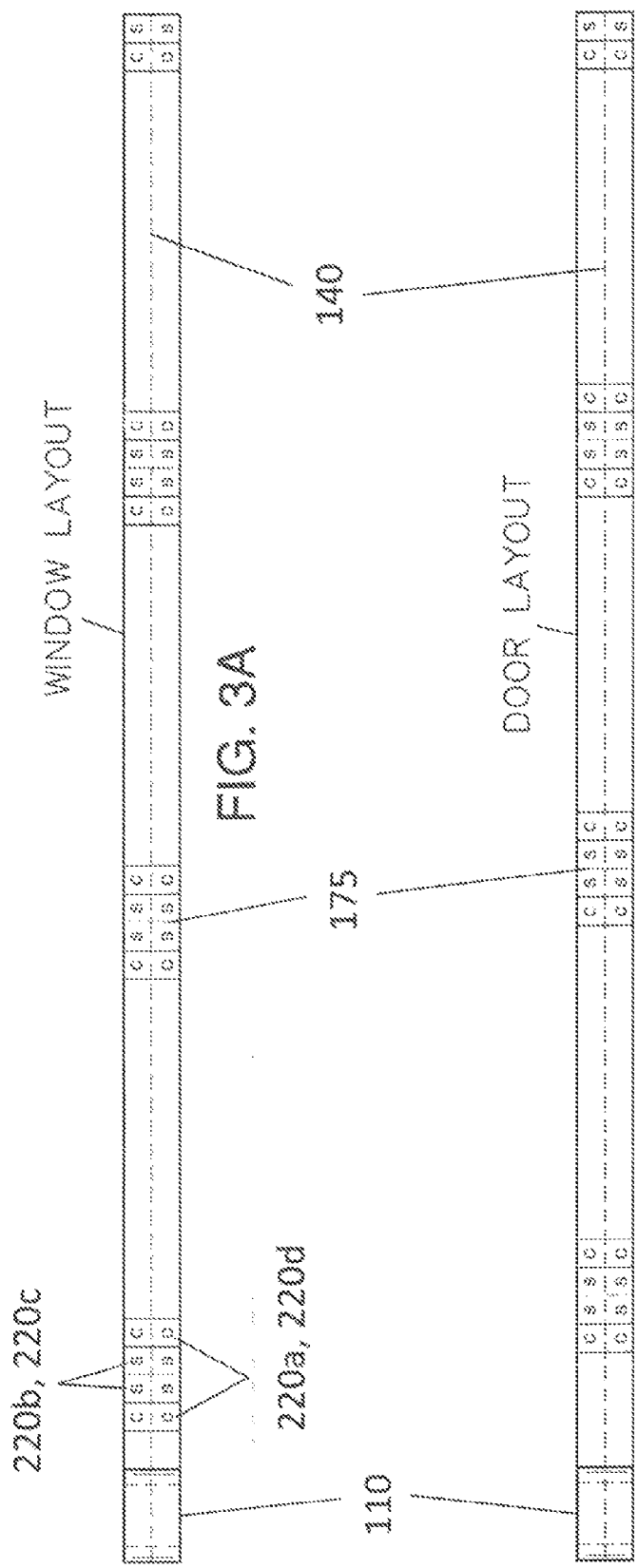
FIG. 3A is a top view of an embodiment of the tape system of the present invention (e.g., for a window layout).
FIG. 3B is a top view of an embodiment of the tape system of the present invention (e.g., for a door layout).

Referring now to FIGS. 1-5, the present invention features a tape system 100 for helping to ensure frame pieces 101 (e.g., wood, metal joist rafters, etc.) are assembled appropriately and exactly. The tape system 100 of the present invention comprises an elongated strand 110. The strand 110 is flexible to be moved into a roiled configuration (e.g., a roll, see FIG. 1). The strand 110 has a first end 111, a second end, a first edge (e.g., front edge), a second edge (e.g., back edge) a top surface 113, and a bottom surface, wherein an adhesive is disposed on the bottom surface. The first end 111 of the tape system 100 is free. As shown in FIG. 1, the tape system 100 can be laid across a frame piece 101.

Disposed in the middle of the strand 110 running the length of the strand 110 (e.g., from the first end 111 to the second end) is a center line 140. Disposed across the strand 110 is a plurality of center markers 180. The center line 140 divides the center markers 180 into a top portion and a bottom portion. The center markers 180 are each spaced a first distance (e.g., 16 inches) 180a, or a second distance (e.g., 24 inches) 180b, apart (see FIG. 2A, FIG. 2B) or a third distance, etc. The distances are according to spaces between studs, for example studs may be spaced 16 inches apart, 24 inches apart, etc.

In some embodiments, the center markers 180 are each labeled with a first letter. For example, as shown in FIG. 4 and FIG. 5, the center markers 180 may be labeled with "T" for indicating "top," and/or "C" for indicating "corners." As shown in FIG. 3A and FIG. 3B, the center markers 180 may be labeled with letters, for example "C" and/or "S," referring to cripples and studs, respectively. In some embodiments, both the top portion and the bottom portion of each center marker 180 is labeled with a first letter 220a, a second letter 220b, a third letter 220c, and a fourth letter 220d (e.g., C-S-S-C). The first letter is positioned to the left of the second letter, the second letter is positioned to the left of the third letter, and the third letter is positioned to the left of the fourth letter (see FIG. 3A and FIG. 3B).

Perforations 175 are disposed in each of the center markers 180, allowing the tape 100 to be torn as needed. The perforations 175 are perpendicular to the center line 140 and extend from the first edge of the strand 110 to the second edge of the strand 110. In some embodiments, the perforations 175 are disposed in between the second letters and third letters of the center markers 180.

As used herein, the term "about" refers to plus or minus 10% of the referenced number. For example, an embodiment wherein the strand 110 has center markers 180 that are spaced about 24 inches apart includes a strand 110 with center markers 180 spaced between 21.6 and 26.4 inches apart.

The disclosures of the following U.S. patents are incorporated in their entirety by reference herein: U.S. Pat. No. 4,149,320; U.S. Pat. No. 7,059,061; U.S. Pat. No. 2006/0096112; U.S. Pat. No. 6,684,522; U.S. Pat. No. 7,373,731; U.S. Pat. No. 5,012,590.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore the scope of the invention is only to be limited by the following claims.

What is claimed is:

1. A tape system for obtaining accurate construction layouts, said tape system comprising:
   (a) an elongated strand having a first end, a second end, a first edge, a second edge, a top surface, and a bottom surface, wherein an adhesive is disposed on the bottom surface, the strand is flexible to allow movement between a rolled configuration and an elongated configuration when laid across a construction component;
   (b) a center line disposed in a middle of the strand running from the first end to the second end of the strand;
   (c) a plurality of center markers disposed along the strand, the center markers are each spaced a first distance apart, wherein the center line divides each center marker into a top portion and a bottom portion, wherein both the top portion and the bottom portion of each center marker is labeled with a first letter, a second letter, a third letter, and a fourth letter, the first letter being positioned to the left of the second letter, the second letter being positioned to the left of the third letter, the third letter being positioned to the left of the fourth letter; and
   (d) perforations disposed in each center marker, the perforations being perpendicular to the center line and extending from the first edge of the strand to the second edge of the strand in between the second letters and third letters, the perforations allow the strand to be torn, the first and fourth letters are the same, the second and third letters are the same.

2. The tape system of claim 1, wherein the first distance is about 16 inches or about 24 inches.

3. The tape system of claim 1, wherein the first letter, second letter, third letter, or fourth letter is C, S, or T.

* * * * *